No. 780,029. PATENTED JAN. 17, 1905.
M. FLEGLE.
TROLLING FLOAT.
APPLICATION FILED APR. 29, 1904.
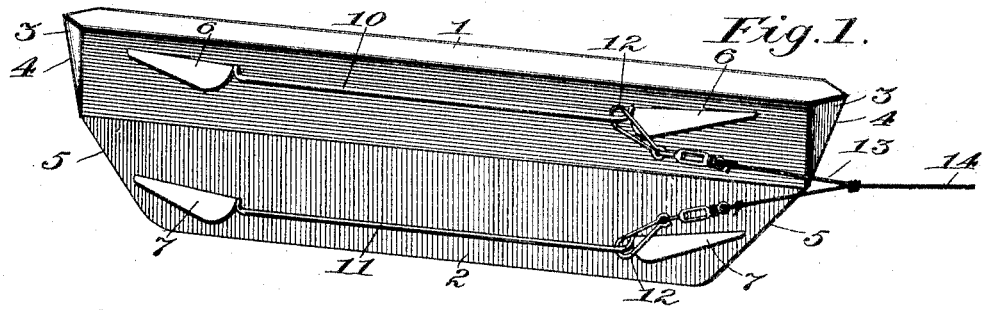
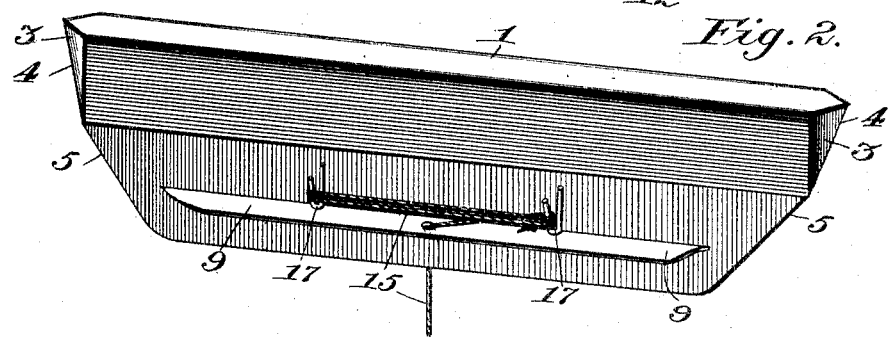
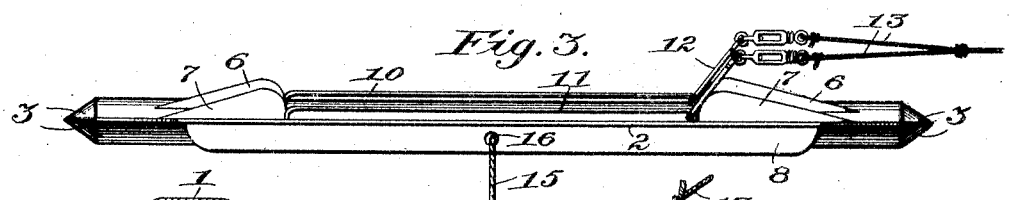
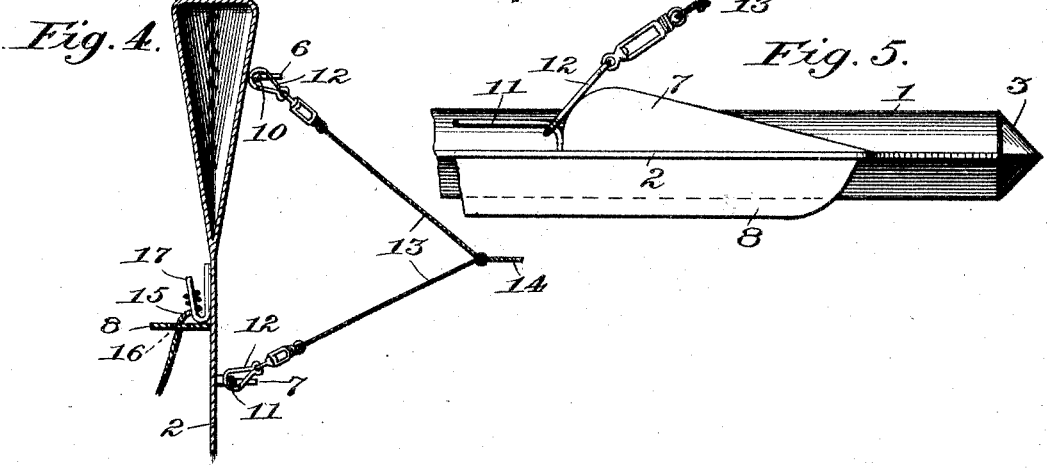
Witnesses:
H. A. Bowman
Gertrude Taylor
Inventor:
Martin Flegle
By P. H. Gunckel
his Attorney No. 780,029. Patented January 17, 1905.

UNITED STATES PATENT OFFICE.

MARTIN FLEGLE, OF MINNEAPOLIS, MINNESOTA.

TROLLING-FLOAT.

SPECIFICATION forming part of Letters Patent No. 780,029, dated January 17, 1905.

Application filed April 29, 1904. Serial No. 205,487.

*To all whom it may concern:*

Be it known that I, MARTIN FLEGLE, a citizen of the United States, residing at Minneapolis, county of Hennepin, and State of Minnesota, have invented certain new and useful Improvements in Trolling-Floats, of which the following is a specification.

My invention relates to floats for use in fishing; and its principal object is to provide a moving float adapted to carry a line or lines at the side of and some distance from a moving boat and also adapted to be operated in like manner from the shore.

The device, stated in a general way, consists of a relatively long and flat body, preferably tapering toward the bottom and at the ends and made sufficiently buoyant to float with its wider edge above the surface of the water, suitable fin-like lateral projections at the sides, and adjustable guy-cords and a tow-line for operating the device.

My improvements are illustrated in the accompanying drawings, in which—

Figure 1 is a side elevation of the device viewed from the side to which the tow-line is connected. Fig. 2 is a similar view of the opposite side of the device. Fig. 3 is a plan view of the device inverted. Fig. 4 is a transverse sectional view, and Fig. 5 is an enlarged view, of part of the right-hand portion of Fig. 3.

In the drawings, 1 designates the upper relatively wide and hollow portion of the body adapted to cause the device to float, and 2 the lower and flat portion adapted to maintain the body in upright position. This body is preferably formed of tin or other sheet metal bent to the desired shape and having the edges soldered together. The hollow portion 1 is preferably of triangular shape in cross-section, about as shown, and the lower portion 2 is preferably inclined to a slight extent toward the tow-line side, as indicated in Fig. 3. The walls of the upper portion 1 are made to converge at the ends, as shown at 3, and these ends are also beveled inward and downward, as shown at 4, and the ends of the lower body portion 2 are also beveled or inclined inward to the lower edge, as shown at 5. At the tow-line side are upper and lower fin-like tapering lateral extensions 6 and 7, respectively. These fins are located near the ends, from which they trend slightly downward toward the middle, for the purpose of causing the front portion of the float to rise and the rear portion to lower to a suitable extent, and thereby avoid any tendency of the device to dive while in motion. On the opposite side and attached to the lower portion 2 is a thin flange 8, extending nearly to the ends of the body and having its end portions slightly bent in upward direction, as shown at 9, to coöperate with the fins 6 and 7 in causing the forward end of the float in motion to tend to rise.

To the inner ends of the fins 6 and 7 are attached guide-rods 10 and 11, to which the tow-line or controlling-line is connected. This connection is preferably made by means of rings 12, which may slide upon the rods and to which are attached suitably-convergent guy-cords 13 for attachment of the tow-line 14. Although the rings 12 are capable of sliding freely from end to end on the rods 10 and 11, they remain in position at the forward ends of the guides so long as the tension upon the tow-line continues; but when the latter is slacked the momentum of the float, combined with the resistance of the water to the forward movement of the line and connections, will cause the rings to slide to the other ends of the guide-rods, whereupon a renewal of tension upon the line will cause the float to tack or move in opposite direction. Obviously if it is desired to have the float head in one direction only the guy-cords could be permanently attached and the rings and guide-rods dispensed with; but such arrangement would greatly limit the degree of usefulness of the device.

To utilize the float for trolling, a line 15 may be attached to it, and short lines (not shown) may also be attached to a portion of the tow-line. Preferably the line 15 is passed through a hole 16 in the flange 8, near its middle, so as not to interfere with the reversal of the float movement, and the length of the line can be regulated by winding it around a pair of hook-shaped holders 17, secured to the body 2 above the flange 8.

In operating the float in a current or from a moving boat or by walking along shore the float is placed in the water with the rings 12 of the guy-cords set at the forward ends of the guide-rods 10 and 11, and tension is then exerted upon the tow-line, which will cause the float to move in an oblique direction as long as the line is paid out and held sufficiently taut. To cause it then to move in an opposite oblique direction, it is only necessary to slacken the tow-line until the resistance of the water upon it and the momentum of the float have caused the rings of the guy-cords to be shifted to the opposite or rear ends of the guide-rods, whereupon renewal of tension upon the tow-line will start the float in opposite oblique direction. The tow-line can be most satisfactorily controlled by means of an ordinary fishing-rod and reel.

Having described my invention, what I claim, and desire to secure by Letters Patent, is—

1. A float, comprising a relatively long and tapering body having fin-like projections and adapted to float edgewise, and a tow-line and suitable connecting devices for causing the float to move in the water at an angle to the line of traction, substantially as set forth.

2. A float, comprising a relatively long and tapering body having fin-like projections and adapted to float edgewise, and a tow-line and slidable connecting devices for causing the float to move in the water at an angle to the line of traction, and for changing the direction of movement, substantially as set forth.

3. A float, comprising a buoyant body of somewhat wedge shape in cross-section and having fins at its sides, and a tow-line and suitable connecting devices for causing the float to move in the water at an angle to the line of traction, substantially as set forth.

4. A float, comprising a buoyant body of somewhat wedge shape in cross-section and having fins at both sides and guide-rods at one side, and a tow-line and connecting devices slidable on said guides for causing the float to move in the water at an angle to the line of traction, and for changing the direction of movement, substantially as set forth.

5. A float, comprising a buoyant body of somewhat wedge shape in cross-section and having upper and lower pairs of fins at one side and a relatively long fin-like flange at the opposite side, parallel guide-rods extending between the two members of each pair of fins, and a tow-line and connecting devices slidable on said guides for causing the float to move in the water at an angle to the line of traction, and for changing the direction of movement, substantially as set forth.

6. A float, comprising a buoyant body of somewhat wedge shape in cross-section and having upper and lower pairs of inclined fins at one side adapted to prevent diving and a relatively long fin-like flange at the opposite side, parallel guide-rods extending between the two members of each pair of fins, and a tow-line and connecting devices slidable on said guides for causing the float to move in the water at an angle to the line of traction, and for changing the direction of movement, substantially as set forth.

7. A float, comprising a buoyant body of somewhat wedge shape in cross-section and having upper and lower pairs of fins at one side and a relatively long fin-like flange at the opposite side, a trolling-line connected centrally to such flange, parallel guide-rods extending between the two members of each pair of fins, and a tow-line and connecting devices slidable on said guides for causing the float to move in the water at an angle to the line of traction, and for changing the direction of movement, substantially as set forth.

In testimony whereof I have signed my name to this specification, in the presence of two subscribing witnesses, this 25th day of April, 1904.

MARTIN FLEGLE.

Witnesses:
P. H. GUNCKEL,
H. A. BOWMAN.